(12) United States Patent
Suzuki et al.

(10) Patent No.: US 6,278,214 B1
(45) Date of Patent: Aug. 21, 2001

(54) MOTOR, METHOD OF PRODUCING MOTOR, AND ROTATOR DEVICE

(75) Inventors: Takafumi Suzuki; Hiromitsu Goto, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/540,376

(22) Filed: Mar. 31, 2000

(30) Foreign Application Priority Data

Apr. 2, 1999 (JP) .................................................. 11-097022

(51) Int. Cl.$^7$ ................................. H02K 1/18; H02K 5/00
(52) U.S. Cl. ...................... 310/217; 310/217; 310/DIG. 6
(58) Field of Search ..................................... 310/91, 67 R, 310/42, 217, DIG. 6; 360/98.07, 99.04, 99.08

(56) References Cited

U.S. PATENT DOCUMENTS

| | | | | |
|---|---|---|---|---|
| 5,027,026 | * | 6/1991 | Mineta et al. | 310/259 |
| 5,173,628 | * | 12/1992 | Yoshida et al. | 310/71 |
| 5,461,271 | * | 10/1995 | Asama et al. | 310/91 |
| 5,530,311 | * | 6/1996 | Ziegler | 310/237 |
| 5,578,883 | * | 11/1996 | Sakashita et al. | 310/91 |
| 5,942,821 | * | 8/1999 | Shin | 310/67 R |
| 6,005,312 | * | 12/1999 | Yamane | 310/67 R |

* cited by examiner

Primary Examiner—Tran Nguyen
(74) Attorney, Agent, or Firm—Adams & Wilks (57) ABSTRACT

To provide a motor capable of solidly supporting a stator coil with high rigidity and having inconsiderable vibration and noise, a method of fabricating a motor and a rotary body apparatus, there is provided a motor including a base 10, a sleeve 20 erected on the base, a yoke 41 having a hollow portion in a regular polygonal shape penetrating from one end to other end, the hollow portion being inserted to the sleeve 20 and coaxially fixed to the sleeve 20, a stator coil 40 including coils 42 formed by winding lead wires at a, plurality of locations of the yoke 41, a rotor member 30 supported coaxially with and rotatably by the sleeve 20 and a rotor magnet 60 fixed to the rotor member 30 and urged by rotational magnetic field in which an inner peripheral face portion of the yoke 41 is brought into contact with an outer peripheral face portion of the sleeve 20 at substantially central portions thereof among contiguous ones of corner portions thereof over an entire length along an axial direction and is constituted by the respective contact portions and separated portions where the respective plane portions reaching the corner portions on both sides are separated from and opposed to the sleeve 20.

10 Claims, 8 Drawing Sheets

PRIOR ART

FIG. 8

MOTOR, METHOD OF PRODUCING MOTOR, AND ROTATOR DEVICE

BACKGROUND OF THE INVENTION

The present invention relates to a motor, a method of fabricating a motor and a rotary body apparatus, further in details, relates to a motor capable of solidly supporting a stator coil with high rigidity and having small vibration and noise, a method of fabricating a motor and a rotary body apparatus.

Figure 7:
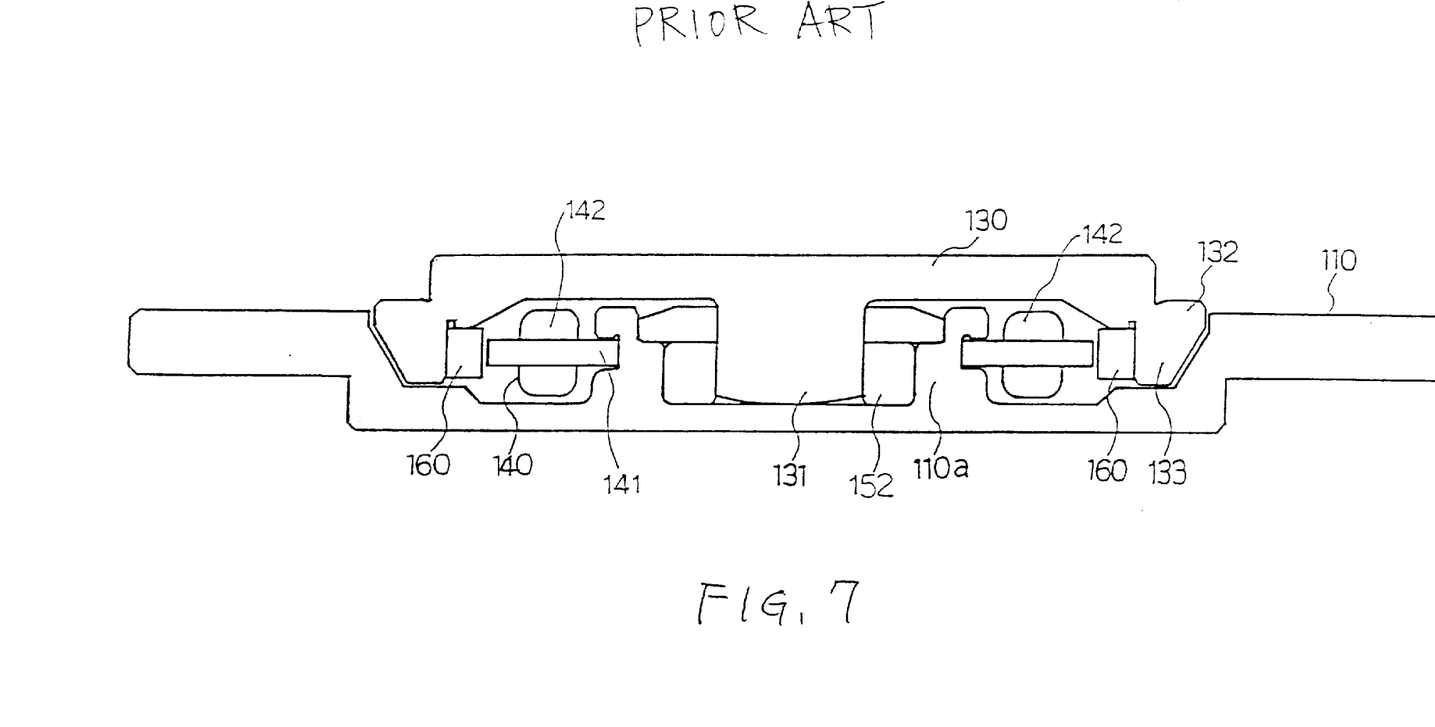
FIG. 7 is a sectional view in an axial direction showing a motor according to a conventional technology.

Conventionally, in a rotary body apparatus such as a rotary polygonal face mirror apparatus of a laser beam printer or the like or HDD (hard disk drive), there is used a motor as shown by FIG. 7.

The motor shown by FIG. 7 is provided with a base 110 having a fitting portion (supporting member) 110a projected in a circular ring shape, a hub shaft 130 extended with a shaft 131 from the center of a hub 132 in a circular disk shape and a bearing ring 152 fixedly attached to a lower end portion of the shaft 131.

The bearing ring 152 is inserted into the fitting portion 110a of the base 110, thereby, the hub shaft 130 is rotatably supported by the base 110.

A circular ring portion 133 is extended from a peripheral edge portion of the hub shaft 130 in a lower direction and a rotor magnet 160 is fixed to an inner peripheral wall of the circular ring portion 133.

A stator coil 140 is fixed to an outer peripheral face of the fitting portion 110a.

Figure 8:
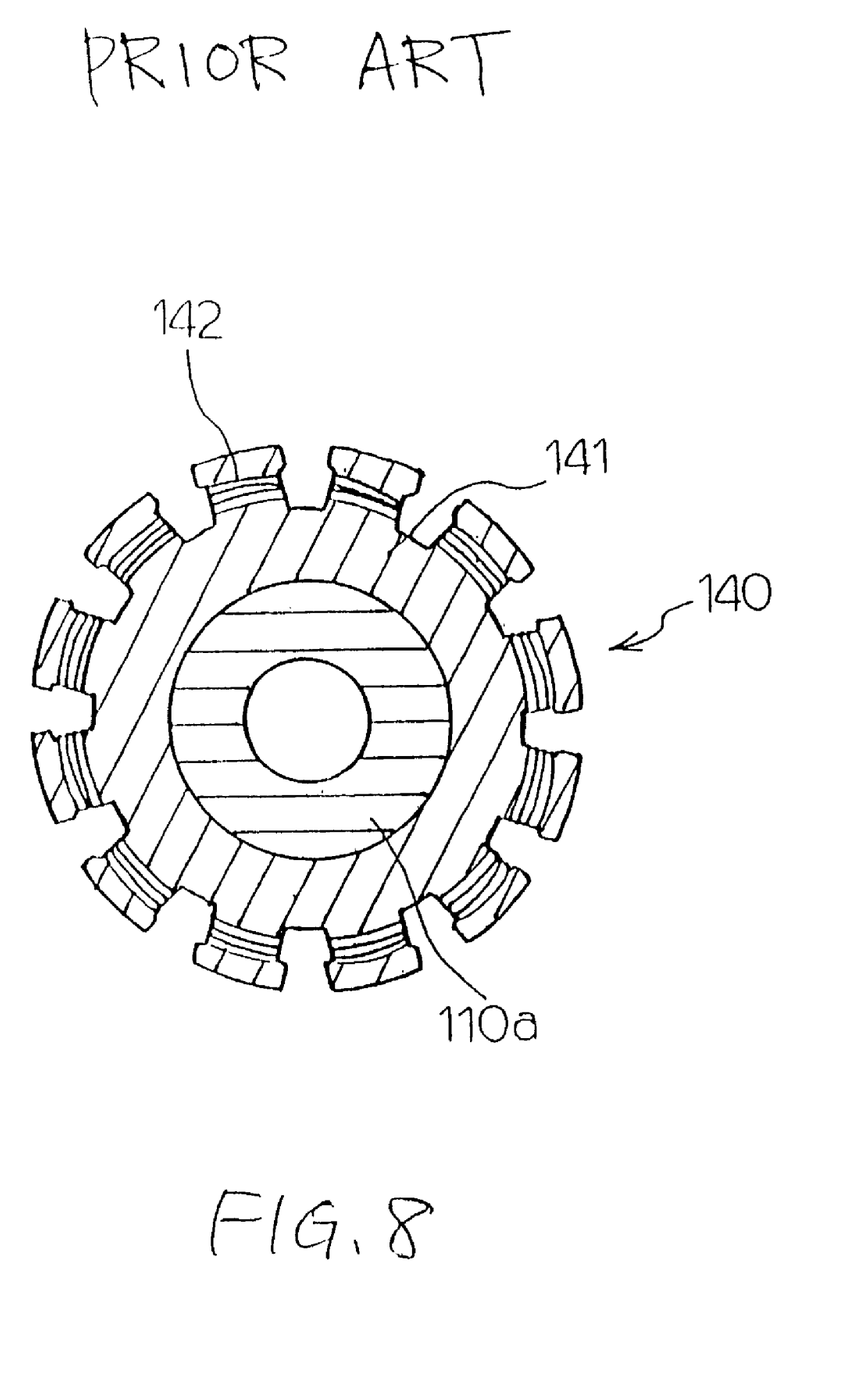
FIG. 8 is a view showing a contact state of a stator coil and a sleeve of the motor according to the conventional technology.

As shown by FIG. 8, the stator coil 140 comprises a sheet-like yoke 141 laminated with a single or a plurality of sheets having the same shape and coils 142 formed by winding lead wires at the yoke 141. The yoke 141 comprises a mounting portion in a circular ring shape and a plurality of winding portions extended from the mounting portion outwardly in the diameter direction and is fixed to the fitting portion 110a by inserting the fitting portion 110a to a hollow portion of the mounting portion. The coil 142 is formed by winding lead wires around the winding portion.

Further, rotary magnetic field is formed by the stator coil 140 and the rotor magnet 160 is urged by the rotary magnetic field to thereby rotate the hub shaft 130.

The base 110 is fixed to a chassis of a main body apparatus of a printer or HDD.

Such a motor is used in a quiet place such as an office building or the like and therefore, it is requested to restrain vibration as less as possible and prevent noise from being emitted in driving to rotate the motor. Further, particularly in HDD, by high density formation of a hard disk in recent years, fineness is requested in a position of reading data by a magnetic head and also in this regard, there is requested a motor restraining vibration as less as possible, providing high rigidity and rotating with excellent rotational accuracy.

As a method of restraining vibration, there is conceived a technology of forming the fitting portion 110a projected from the base 110 separately and fixing the fitting portion 110a by adhering or fitting. According to the technology, vibration from the stator coil 140 is transmitted to the base 110 after having been attenuated and accordingly, vibration from the stator coil 140 is reduced.

Now, according to the conventional motor, mentioned above, either of an outer peripheral face of the fitting portion 110a provided to the base 110 (both of the fitting portion 110a integrated to the base 110 and the fitting portion 110a separately fixed thereto) and an inner peripheral face of the mounting portion of the yoke is provided with a sectional shape in view from the axial direction in a circular shape. The reason is that the shape is suitable for lathe machining since machining of the fitting portion or the yoke is carried out by the lathe machining and the integrating performance of the stator of the motor for supporting the rotor portion (hub shaft) is excellent.

Further, in order to accurately rotate the rotor portion, there is needed high durability against load applied in high speed rotation and accordingly, in any case, it is necessary to machine to form these parts with excellent roundness and to fit and fix these parts.

However, actually, by influence of chucking in a lathe, it is not possible to machine either of the outer peripheral face of the fitting portion and the inner peripheral face of the mounting portion of the yoke such that sections of these become completely round (complete roundness) and actually, these parts are machined in a irregular circle including the roundness.

Further, when the fitting portion having the outer peripheral face of such an irregular circular shape, is mounted with the mounting portion of the yoke similarly having an irregular circular shape, face contact is not constituted, and in either of the circumferential direction and the axial direction, there is brought about a state in which contact portions and separated portions are irregularly arranged.

Therefore, there are produced portions where external force is received by gaps, the rigidity is deteriorated and when the motor is driven to rotate, the motor is liable to deviate by load of rotation to thereby cause an increase in vibration and noise. Further, the deviation is difficult to deal with since the deviation is caused irregularly.

SUMMARY OF THE INVENTION

The invention has been carried out to resolve the above-described problem and it is an object thereof to provide a motor capable of solidly supporting a stator coil with high rigidity and having inconsiderable vibration and noise, a method of fabricating a motor and a rotary body apparatus.

The invention achieves the above-described object by providing a motor comprising a base, a supporting member in a column-like shape erected on the base, a yoke having a hollow portion at least one end of which communicates with outside, the hollow portion being inserted by the supporting member and coaxially fixed to the supporting member, coils formed by winding lead wires at a plurality of locations of the yoke for generating a rotary magnetic field, a rotor member coaxially with and rotatably supported by the supporting member, and a rotor magnet fixed to the rotor member and urged by the rotary magnetic field for rotating the rotor member, wherein at least one of an inner peripheral face portion of the yoke and an outer peripheral face portion of the supporting member comprises contact portions linearly projected to other thereof and brought into contact with the other at three or more locations in a circumferential direction thereof and separated portions separated from the other and opposed to the other among the contact portions.

According to the motor of the invention, the contact portions projected linearly at the three or more locations in the circumferential direction are arranged at least either of the inner peripheral face portion of the yoke and the outer peripheral face portion of the supporting member. Further, when the supporting member is inserted into the yoke by press fitting, the contact portions are widened toward the separated portions to crush to deform in very small amounts in accordance with the shape of the outer peripheral face of the supporting member, machining error is corrected and the yoke and the supporting member are brought into close contact with each other at the contact portions with no clearances therebetween.

In this way, according to the invention, the supporting member and the yoke can be brought into contact with each other at the contact portions with certainty. Therefore, contact locations of the supporting member and the yoke can be controlled by positions of arranging the contact portions and vibration or deviation caused in rotational operation can easily be dealt with in view of design.

Further, the supporting member and the yoke are brought into contact with each other linearly at the three or more locations in the circumferential direction and accordingly, in rotational operation the supporting member and the yoke are difficult to be deviated from each other and vibration produced by the deviation can be restrained to reduce.

It is preferable that the contact portions are arranged at equal intervals in the circumferential direction at the inner peripheral face portion of the yoke or the outer peripheral face portion of the supporting member. The reason is that the stator coil is supported by substantially uniform force with no deviation over the total in the circumferential direction, load in rotational operation is distributed substantially uniformly over the total in the circumferential direction, excellent rotational accuracy is achieved and deviation in the rotational operation can be restrained to reduce. Further, as a result, vibration or noise can be reduced.

Further, it is preferable that the contact portions are arranged over entire lengths thereof in the axial direction at portions of the inner peripheral face portion of the yoke and the outer peripheral face portion of the supporting member opposed to each other. The reason is that load in the rotational operation is distributed substantially uniformly over the total in the axial direction. The deviation in the rotational operation can be restrained to reduce, thereby, vibration or noise can be reduced.

Although the contact portions need to be formed linearly, the contact portions may be formed in a linear shape, a meandering shape or a curved shape. In this case, "linearly" signifies a slenderness to a degree by which when the supporting member is inserted into the yoke, the contact portions are pressed and deformed by the press force to thereby enable to be brought into close contact with the other side. Therefore, the linear shape includes a slender strip shape having a width to some degree.

Further, the contact portion may be formed such that a distance from the contact portion to the other side is reduced and the shape is restricted in view of a relationship with the other side. Accordingly, at the inner peripheral face portion of the yoke or the outer peripheral portion of the supporting member both having the contact portions, the contact portions may not necessarily be formed to project outward from the surroundings of the contact portions. For example, in the case in which the inner peripheral face of the yoke is formed to provide a section in an n-angular shape in the radial direction and the outer peripheral face of the supporting member is formed to provide a section in a circular shape in the radial direction, although respective central portions of n of plane portions constituting the inner peripheral face of the yoke in the radial direction, are disposed on planes the same as those of the surroundings, the central portions are formed to be more proximate to the outer peripheral face of the supporting member than the surroundings and constitute the contact portions.

According to the motor of the invention, a portion of the supporting member opposed to the yoke is formed in a shape of a circular cylinder and the yoke is formed with the hollow portion substantially in a polygonal cylinder shape coaxially with the supporting member, substantially the central portions between corner portions of the inner peripheral portion can form the contact portions and plane portions from the substantially central portions to the corner portions on both sides thereof can form the separated portions.

According to the motor of the invention, a portion of the supporting member opposed to the yoke is formed in a shape of a circular cylinder, the yoke includes a ring-like portion formed with the hollow portion and teeth-like portions projected inwardly from a plurality of locations of an inner peripheral face portion of the ring-like portion over an entire length of the ring-like portion in the axial direction, the teeth-like portions can form the contact portions and the separated portions can be formed by other than the plurality of locations in the inner peripheral face portion.

According to the motor of the invention, the yoke is provided with the hollow portion substantially in a circular cylindrical shape, the supporting member is formed substantially in a shape of a polygonal cylinder, the contact portions can be formed by edge portions thereof and the separated portions can be formed by plane portions among the edge portions.

According to the motor of the invention, the yoke is provided with the hollow portion substantially in a circular cylindrical shape, the supporting member includes a column-like portion and teeth-like portions projected outwardly from a plurality of locations of an outer peripheral face portion of the column-like portion over an entire length of the yoke in the axial direction, the contact portions can be formed by the teeth-like portions and the separated portions can be formed by other than the plurality of locations in the outer peripheral face portion.

According to the motor of the invention, a number "m" of coils of the stator coil and a number "N" of the contact portions can be brought into a relationship of the following equation. N=k'm or N=m/k (where k is a natural number)

Thereby, the load balance in rotational operation is changed in one rotation with a constant period, the stator coil can be maintained substantially in the same state and excellent load balance can be achieved.

According to the motor of the invention, the contact portions can be arranged on diameters the same as those of the coils of the stator coil.

According to the yoke, portions thereof wound with the coils or vicinities thereof are mostly difficult to deform. Therefore, by arranging the contact portions on the diameters the same as those of the coils of the stator coil and disposing contact portions of the supporting member and the yoke at vicinities of the coils of the stator coil as mentioned above, strain of the yoke caused by bringing the yoke into contact with the supporting member can be restrained to reduce. Further, excellent load balance in rotational operation can be achieved.

According to the motor of the invention, the contact portions can be arranged at positions at equal intervals of contiguous ones of the coils of the stator coil.

When the contact portions are arranged at the positions at equal intervals from the coils in this way, in rotational operation of the motor, vibration of the coil produced by suction and repulsion with the magnet of the rotor portion, is transmitted from the coil to the yoke while being attenuated and accordingly, resonance in the yoke is restrained to reduce, vibration transmitted to the contact portions and transmitted from the contact portions to outside via the supporting member and the base is restrained to reduce.

According to the motor of the invention, the supporting member can be formed separately from the base and one end portion thereof can be fixed to and erected on the base.

By forming the supporting member separately from the base in this way, the stator coil and the rotor can be positioned independently from the base and positioning of a magnetic center of the stator coil and a magnetic center of the magnet of the rotor portion and positioning of the position of the rotor from the base, can easily be determined and fixed to predetermined distances. Therefore, fabrication with high accuracy is made possible and vibration caused by deviation of the magnetic center can be restrained to reduce.

Further, vibration generated at the stator coil is not transmitted directly but is attenuated between the supporting member and the base and therefore, vibration or noise at outside is reduced.

Further, by integrating the rotor portion fixed with the magnet and the supporting member fixed with the stator coil, carrying out tests as the motor of measuring electric properties or vibration properties and attaching only an acceptable product to the base, wasteful use of the base or wasteful attaching operation is dispensed with and an unprepared increase in the cost can be avoided.

Further, the invention can achieve the above-described object by providing a method of fabricating a motor according to the motor specified above, the method comprising a yoke fixing step of fixing the yoke to the supporting member in a state in which the contact portions of the yoke are brought into contact with the outer peripheral circular portion of the supporting member by press-fitting or shrinkage-fitting the supporting member in the column-like shape erected on the base and having a diameter larger than a diameter of a circumference including free circular end portions of the contact portions of the yoke to the hollow portion of the yoke having the hollow portion at least one end of which communicates with the outside and the contact portions projected inwardly and linearly from the inner peripheral face portion forming the hollow portion at least the three or more locations in a circumferential direction thereof, a stator coil forming step of forming the stator coil by winding lead wires at the plurality of locations of the yoke to thereby form the rotary magnetic field, a rotor member arranging step of arranging the rotor member coaxially with and rotatably by the supporting member, and a magnet fixing step of fixing the rotor magnet to the rotor member so as to be urged by the rotary magnetic field formed by the stator coil.

The above-described motor of the invention can be fabricated by the method of fabricating the motor.

Further, the invention achieves the above-described object by providing a method of forming a motor according to the motor specified above, the method comprising a yoke fixing step of fixing the yoke to the supporting member in a state in which the contact portions of the supporting member are brought into contact with the inner peripheral face portion formed with the hollow portion of the yoke by press-fitting or shrinkage-fitting the supporting member erected on the base and having the contact portions linearly projected outwardly from three or more locations in a circumferential direction to the hollow portion of the yoke having the hollow portion in a shape of a circular cylinder at least one end of which is continuous to the outside and having a diameter smaller than a diameter of a circumference including free edge end portions of the contact portions, a stator coil forming step of forming the stator coil by winding lead wires at the plurality of locations of the yoke to thereby form the rotary magnetic field, a rotor member arranging step of arranging the rotor member coaxially with and rotatably by the supporting member, and a magnet fixing step of fixing the rotor magnet to the rotor member so as to be urged by the rotary magnetic field formed by the stator coil.

The above-described motor of the invention can be fabricated by the method of fabricating the motor.

Further, the invention achieves the above-described object by providing a rotary body apparatus including the motor according to the invention.

According to the rotary body apparatus of the invention, by providing the motor of the invention, vibration and the noise can be restrained to reduce and high rotational accuracy can be achieved.

DETAILED DESCRIPTION OF THE PREFERRED EMBODIMENT

A detailed explanation will be given of embodiments of the invention in reference to the drawings as follows.

Figure 1:
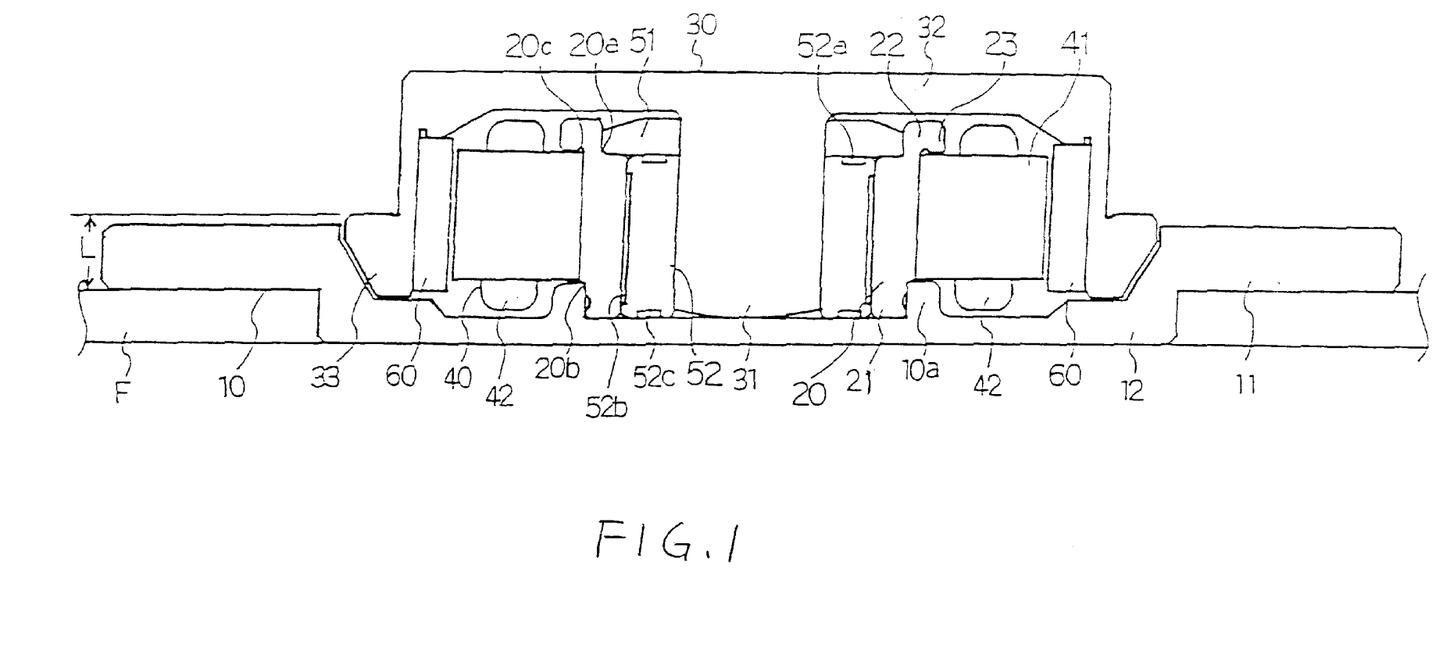
FIG. 1 is a sectional view in an axial direction showing an embodiment of a motor according to the invention.

FIG. 1 is a sectional view in an axial direction showing an embodiment of a motor according to the invention.

The motor according to the embodiment is used in hard disk drive (HDD) and is provided with a base 10 formed with a fitting portion 10a at its center, a sleeve (supporting member) 20 in a shape of a circular cylinder one end of which is closed and a hub shaft (rotor member) 30 rotating while supporting a hard disk as shown by FIG. 1.

The base 10 is provided with a bottom portion 12 in a circular plate shape and a flange portion 11 extended from an edge peripheral portion of the bottom portion 12 outwardly in the diameter direction while being elevated by one stage. The fitting portion 10a projected in a circular ring shape is formed at the center of the bottom portion 12.

Further, the bottom portion 12 of the base 10 is mounted to a mounting hole formed at a frame F and the flange portion 11 is fixed in a state in which the face of the flange portion 11 is brought into contact with the frame F of HDD.

One end portion 21 of the sleeve 20 on the closed side is fitted to the fitting portion 10a of the base 10 and fixed to the base 10 by an adhering agent and other end side thereof is erected in an upper direction (side opposed to the base 10).

According to the sleeve 20, both of an outer peripheral face and an inner peripheral face thereof are provided with sections in the radial direction in a circular shape over an entire length in the axial direction and a shape of a circular cylinder having a hollow portion having different inner diameter and outer diameter is build up in the axial direction.

The other end portion of the sleeve 20 constitutes a large diameter portion 22 having a widened diameter and with a change in the diameter, there are formed stepped portions (first stepped portion 20a and second stepped portion 20b) at respectives of an inner peripheral wall and an outer peripheral wall of the sleeve 20. Further, an upper edge end portion of the other end portion is thickened outwardly in the diameter direction to thereby form a coil locking edge 23 and in accordance with a change in the thickness, there is formed a stepped portion (third stepped portion 20c) at the outer peripheral wall.

Further, a stator coil 40 is fixed from outside in the radius direction to the large diameter portion 22 of the sleeve 20.

The stator coil 40 is constituted by a yoke 41 and coils 42 formed by winding lead wires at the yoke 41.

Figure 2:
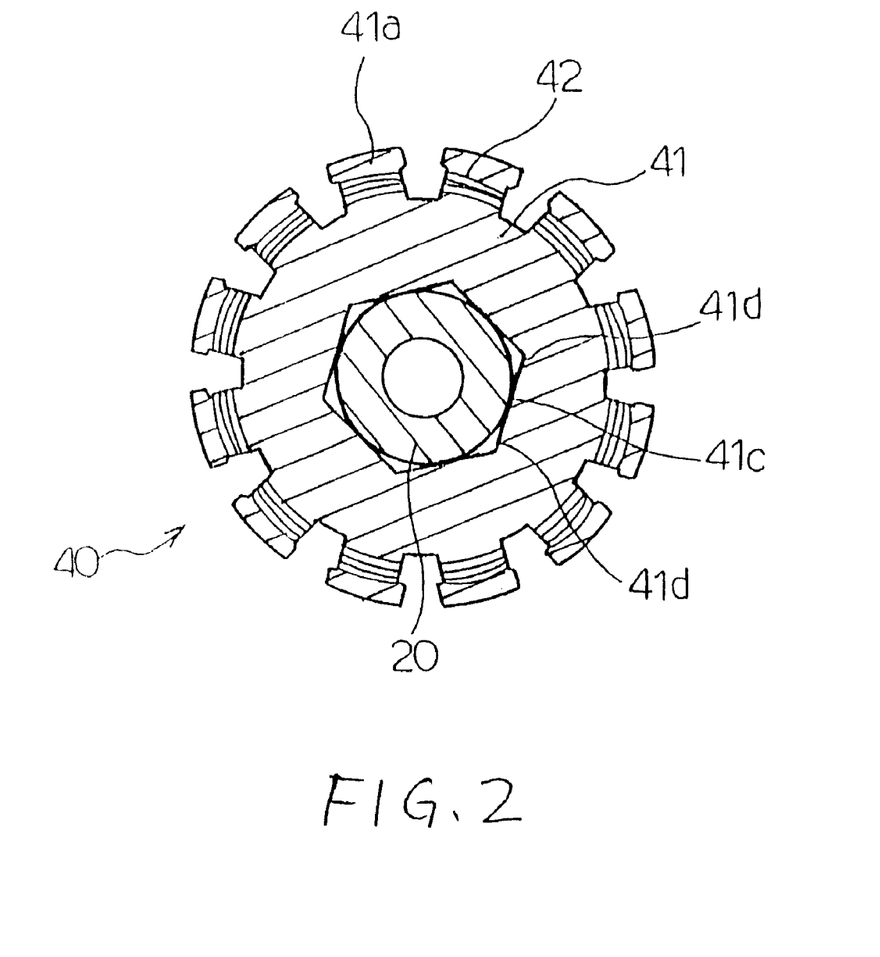
FIG. 2 is a view showing a contact state of a stator coil and a sleeve.

FIG. 2 is an explanatory view showing a contact state of the stator coil 40 and the sleeve 20. The yoke 41 is provided with a hollow portion penetrating from one end to other end thereof. As shown by FIG. 2, the hollow portion is provided with a section in a hexagonal shape and the sleeve 20 is inserted coaxially into the hollow portion by press fitting. Further, at the inner peripheral portion, substantially central portions among corner portions contiguous to each other are brought into contact with the outer peripheral face portion of the sleeve 20 over an entire length thereof along the axial direction and respective plane portions among respectives of contact portions 41c thereof and corner portions on both sides thereof constitute separated portions 41d separated from and opposed to the sleeve 20.

Further, the yoke 41 is provided with winding portions 41a projected outwardly in the diameter direction at 12 locations at equal intervals in the circumferential direction and the coils 42 are formed by winding lead wires around the respective winding portions 41a. A half of the coils 42 are arranged on the diameters the same as those of every other ones of the contact portions 41c and a remaining half thereof are arranged at positions at equal intervals from the contiguous contact portions 41c. As a result, the six contact portions 41c are all arranged on the diameters the same as those of the coils 42 and arranged at the positions at equal intervals from the contiguous coils 42.

Further, the respective coils 42 are arranged at equal intervals in the circumferential shape above the bottom portion 12 of the base 10 and a rotational magnet field is formed by conducting electricity to the respective coils 40.

Further, at the upper edge end portion of the sleeve 20, one end face of a retaining ring 51 is mounted on the first stepped portion 20a and the outer peripheral wall is fixedly attached to the inner peripheral face of the sleeve 20.

The hub shaft 30 is provided with a shaft portion 31 in a circular cylinder shape, a hub portion (extended portion) 32 in a circular plate shape extended from one end side of the shaft portion 31 and a circular ring portion 33 extended downwardly from a peripheral edge portion of the hub portion 32.

The shaft portion 31 is inserted to the retaining ring 51 and at the other end portion of the shaft portion 31, a bearing ring 52 is fixedly mounted. The bearing ring 52 is arranged at the hollow portion of the sleeve 20 and shift of the bearing ring 52 in the axial direction is restricted by the retaining ring 51.

The hub portion 32 is arranged above an opened upper edge end portion of the sleeve 20 and covers an upper portion of the bottom portion 12 of the base.

A peripheral end portion of the circular ring portion 33 (end portion on a side opposed to the hub portion 32) is expanded outwardly and an upper face of the peripheral end portion is lowered from the hub portion 32 by one stage and supports a hard disk.

A plurality of rotor magnets 60 are fixedly attached to an inner peripheral wall of the circular ring portion 33 at equal intervals. The rotor magnets 60 are arranged such that positions of magnetic centers of the rotor magnets 60 in the axial direction are the same as that of a magnetic center of the stator coil 40 and are urged by a rotational magnetic field formed by the stator coil 40.

Grooves 52a, 52b and 52c for generating dynamic pressure are formed at an outer peripheral face, an upper end face and a lower end face of the bearing ring 52. Oil is filled in clearances respectively between the bearing ring 52 and the retaining ring 51, between the bearing ring 52 and the sleeve 20 and between one end face of the shaft portion 31 and the sleeve 20.

Further, when the hub shaft 30 is rotated, by the grooves 52a, 52b and 52c for generating dynamic pressure, respectively between the outer peripheral face of the bearing ring 52 and the inner peripheral face of the sleeve 20, between the lower end face of the bearing ring 52 and the one end face of the sleeve 20 and between the upper end face of the bearing ring 52 and the lower end face of the retaining ring 51, the oil is drawn, the dynamic pressure is generated and the bearing ring 52 is supported to float in a state in which very small clearances are produced between the bearing ring 52 and the inner peripheral face of the sleeve 20, the one end face of the sleeve 20 and the lower end face of the retaining ring 51.

According to the motor of the embodiment having the above-described constitution, when the rotational magnetic field is generated at the stator coil 40 by conducting electricity thereto, the rotor magnets 60 are urged by the rotational magnetic field and the hub shaft 30 is rotated.

Further, when by the rotation, the oil is drawn to the dynamic pressure generating grooves 52a, 52b and 52c to thereby generate the dynamic pressure and the rotation is at predetermined speed or higher, the bearing ring 52 and the shaft portion 31 are supported in a state of producing the very small clearances between the bearing ring 52 and the shaft portion 31 and the inner peripheral face of the sleeve 20, the one end face of the sleeve 20 and the lower end face of the retaining ring 51, respectively, and the hub shaft 30 and the bearing ring 52 are rotated in a floating state.

Next, an explanation will be given of a method of fabricating a motor of the above-described embodiment, which is an embodiment of a method of fabricating a motor according to the invention.

The motor according to the embodiment is fabricated by following steps.

That is, firstly, the sleeve 20 and the yoke 41 are formed. At this occasion, the respective planes constituting the inner peripheral face portion of the yoke 41 are formed such that a diameter of a circumference including the substantially central portions of the respective planes in the radial direction (contact portions 41c) becomes smaller than a diameter of the large diameter portion of the sleeve 20.

Successively, the stator coil 40 are formed by winding lead wires at the yoke 41.

Next, the sleeve 20 is press-fitted to the hollow portion of the stator coil 40 from one end side. Thereby, the substantially central portions in the radial direction of the respective planes constituting the inner peripheral face of the yoke 41 are pressed to slightly widen and the substantially central portions of the yoke 41 are respectively brought into press contact with the outer peripheral face of the sleeve 20 with no clearance therebetween over entire lengths in the axial direction. Portions of the yoke 41 other than the substantially central portions are opposed to the outer peripheral face of the sleeve 20 by being separated therefrom.

Further, the hub shaft 30 is formed and the rotor magnets 60 are fixed to the circular ring portion 33 from an inner side in the radius direction.

Successively, the bearing ring 52 and the retaining ring 51 are arranged at the hollow portion of the sleeve 20, the shaft portion 31 of the hub shaft 30 is inserted to hollow portions of the bearing ring 52 and the retaining ring 51 and the inner peripheral wall of the retaining ring 51 is fixed to the shaft portion 31. At this occasion, the stator coil 40 fixed to the sleeve 20 and the rotor magnets 60 fixed to the hub shaft 30 are fixed by adjusting positions of the bearing ring 52 and the shaft portion 31 in the axial direction such that the respective magnetic centers coincide with each other in the axial direction. Further, the outer peripheral wall of the retaining ring 51 is fixed to the sleeve 20.

At the same time, the oil is filled at the respective clearances between the bearing ring 52 and the retaining ring 51, between the bearing ring 52 and the sleeve 20 and between the one end face of the shaft portion 31 and the sleeve 20.

Next, the one end portion 21 of the sleeve 20 is inserted into the fitting portion 10a of the base 10. Further, a distance between the lower face of the flange portion 11 of the base 10 and the upper face of the peripheral edge portion of the hub shaft 30 is adjusted to a predetermined distance and the one end portion 21 of the sleeve 20 is fixedly adhered to the base 10 to thereby finish fabrication of the motor.

In this way, according to the motor of the embodiment, the inner peripheral face portion of the yoke 41 is formed in the regular hexagonal shape in view from the axial direction and there are constituted the contact portions 41c projected such that distances from the axial line are shortened over entire lengths in the axial direction at 6 locations at equal intervals in the circumferential direction. Further, when the sleeve 20 is inserted into the yoke 41 by press fitting, the substantially central portions in the radial direction of the six plane portions constituting the inner peripheral face portion, are deformed by very small amounts by being crushed to press to widen in accordance with the shape of the outer peripheral wall of the sleeve 20 and are brought into close contact with the outer peripheral face of the sleeve 20 with no clearances therebetween. Inner peripheral face portions of the yoke 41 other than portions in contact with the sleeve 20 are opposed to the sleeve 20 by being separated therefrom.

As a result, the yoke 41 is brought into contact with the outer peripheral face of the sleeve 20 with certainty at the six locations at equal intervals in the circumferential direction and the load in rotational operation is distributed substantially uniformly to a total thereof in the circumferential direction and the stator coil 40 is supported by the sleeve 20 by substantially uniform force with no deviation in the total of the circumferential direction.

Further, the sleeve 20 and the yoke 41 of the stator coil 40 are brought into contact with each other over entire lengths of opposed portions opposed to each other in the axial direction.

Therefore, the stator coil 40 is supported by the sleeve 20 with substantially uniform rigidity with regard to deviations in the circumferential direction and the axial direction, the stator coil 40 is difficult to deviate from the sleeve 20 by the load in the rotational operation, vibration and noise are alleviated and the hub shaft 30 can be rotated with high rotational accuracy. Further, there are few failed products and therefore, the fabrication can be carried out at a low cost.

Incidentally, since the hollow portion of the yoke 41 is constituted by the section of the regular polygonal shape in the radial direction, in comparison with the case in which the section is circular in the radial direction, load balance is deteriorated, however, the polygonal shape is formed rotationally symmetrically by constituting the regular polygonal shape and therefore, influence on the rotational accuracy is reduced.

According to the embodiment, the substantially central portions in the radial direction of the respective planes of the yoke 41 are brought into contact with the sleeve 20 with certainty over entire lengths in the radial direction and the contact portions are previously made clear and firm and can be controlled. Further, vibration from the coils 42 is transmitted mainly from the contact portions and therefore, the vibration becomes regular and can be dealt with in view of design.

According to the embodiment, a number "m" of the coils 42 of the stator coil 40 and a number "N" of the contact portions 41c are brought into a relationship of the following equation. $N = m/2$ Therefore, states of contact between the contiguous coils 42 of the stator coil 40 and the supporting member become substantially the same in the respective stator coil 40 and the stator coil 40 can be supported in substantially the same state among the respective coils 42 to thereby enable to provide excellent load balance. Thereby, a deterioration in the load balance can be restrained to a minimum to a degree of no influence on the rotational accuracy in the case in which the hollow portion of the yoke 41 is formed by the section in the circular shape in the radial direction as described above.

According to the embodiment, the contact portions 41c are arranged only on the diameters the same as those of the coils 42 of the stator coil 40 and at positions at equal intervals from the contiguous coils 42. Therefore, the load on the stator coil 40 and the sleeve 20 is arranged rotationally symmetrically and excellent load balance can be provided. Further, all of the contact portions 41c are arranged on the diameters the same as those of the coils 42 and accordingly, strain of the yoke 20 caused by press-fitting the sleeve 20 to the yoke 41 of the stator coil 40 is restrained to a minimum.

According to the motor of the embodiment, the stator coil 40 is fixed to the sleeve 20, the rotor magnets 60 are fixed to the hub shaft 30 and the sleeve 20, the hub shaft 30 and the base 10 are formed respectively separately and are fixedly integrated at later steps.

Therefore, positioning of relative positions of the sleeve 20 and the hub shaft 30 in the axial direction and positioning of relative positions of the base 10 and the hub shaft 30 are independent from each other and are not influenced by each other. Further, the positional relationship in the axial direction between the sleeve 20 and the hub shaft 30 is determined and fixed such that a magnetic field center of the stator coil 40 and a magnetic field center of the rotor magnets 60, which are fixed respectively, coincide with each other in the axial direction, further, the positional relationship in the axial direction between the base 10 and the hub shaft 30 can be determined and fixed such that the distance from the base 10 to the hard disk supporting face becomes a predetermined distance. Further, at this occasion, the stator coil 40, the sleeve 20, the rotor magnets 60 and the hub shaft 30 can be fixed by correcting an error for attaching the stator coil 40 to the sleeve 20, an error of attaching the rotor magnets 60 to the hub shaft 30 and machining error of the respective members. Therefore, according to the embodiment, the product can be fabricated easily with high accuracy. Further, the magnetic field centers of the stator coil 40 fixed to the sleeve 20 and the rotor magnets 60 fixed to the hub shaft 30 can easily be made to coincide with each other in the axial direction and vibration or noise caused by the deviation of the magnetic field centers therebetween can be avoided.

Further, since the sleeve 20 supporting the stator coil 40 and the base 10 are formed separately and integrated, in rotational drive operation, vibration generated at the stator coil 40 is not directly transmitted and is attenuated between the sleeve 20 and the base 10 and therefore, vibration or noise at outside is reduced.

Further, after fixing the rotor magnets 60 and the stator coil 40 to the hub shaft 30 and the sleeve 20 and before fixing these to the base 10, by conducting electricity to the coils 42 and carrying out a test as the motor of measuring electric properties and vibration properties, only acceptable products are fitted and fixed to the base 10 to thereby enable to produce finished products. Therefore, wasteful steps of fitting failed products to the base 10 are dispensed with and the base 10 is not abandoned with failure of the motor as the cause. Therefore, wasteful use of the base or wasteful attaching operation is dispensed with and an unprepared increase in the cost can be avoided.

Next, an explanation will be given of a rotary body apparatus adopting the above-described motor as an embodiment of a rotary body apparatus according to the invention.

Figure 3A:
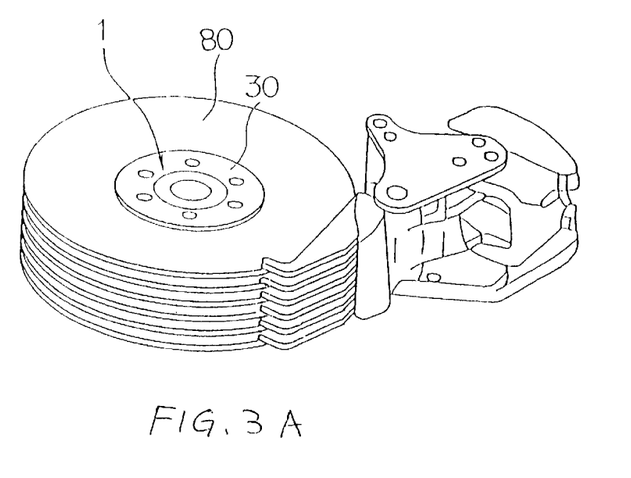
FIG. 3A is a perspective view of essential portions showing an embodiment of a rotary body apparatus according to the invention.
Figure 3B:
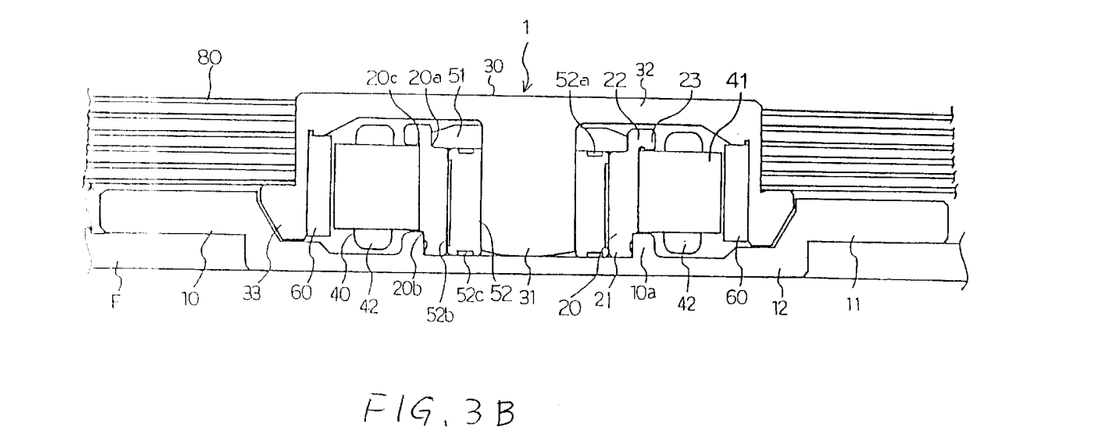
FIG. 3B is a sectional view of essential portions showing the embodiment of the rotary body apparatus according to the invention.

FIGS. 3A and 3B are views showing a hard disk drive according to an embodiment of a rotary body apparatus of the invention in which FIG. 3A is a perspective view and FIG. 3B is a sectional view in an axial direction.

As shown by FIGS. 3A and 3B, the rotary body apparatus (hard disk drive) is provided with a motor 1 according to the embodiment, described above, the base 10 of the motor 1 is fitted and fixed to the frame F of the hard disk drive. Further, a hard disk 80 is supported by the peripheral edge portion of the hub shaft 30 and is rotated along with the hub shaft 30.

According to the hard disk drive of the embodiment adopting the above-described motor 1, vibration of the motor 1 is inconsiderable and is difficult to transmit via the base 10 and accordingly, noise in driving operation is inconsiderable. Further, a distance L from the frame F to the hard disk is maintained accurately and accordingly, with regard to also a disk having a large size and a large recording density, writing or reading can be executed with high reliability.

Further, the invention is not limited to the above-described embodiment but can be modified pertinently so far as the gist of the invention is not deviated.

Figure 4:
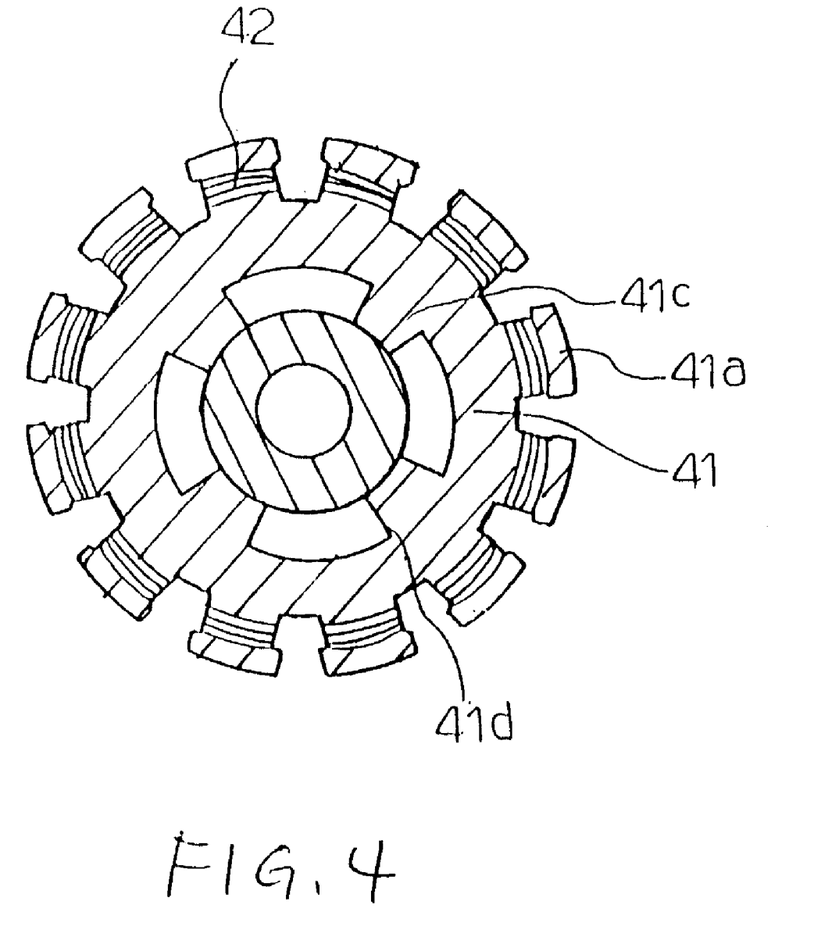
FIG. 4 is a sectional view of essential portions of other embodiment of a motor according to the invention and is a view in correspondence with FIG. 2.

For example, although according to the above-described embodiment, the hollow portion of the yoke is provided with the section in the regular hexagonal shape and according to the inner peripheral face portion of the yoke 41, the substantially central portions among the contiguous corner portions constitute the contact portions 41c in contact with the outer peripheral face portion of the sleeve 20, the shape of the inner peripheral face portion of the yoke 41 is not limited thereto but, for example, as shown by FIG. 4, the yoke 41 may be formed to comprise a ring-like portion formed with a hollow portion and teeth portions projected inwardly from a plurality of locations of an inner peripheral face portion of the ring-like portion over an entire length in the axial direction of the ring-like portion, the teeth-like portions may be brought into contact with the outer peripheral face portion of the sleeve 20 to thereby form the contact portions 41c and the separate portions 41d separated from and opposed to the outer peripheral face portion of the sleeve 20 may be formed at other than the locations of the inner peripheral face portion projected with the teeth-like portions.

Figure 5:
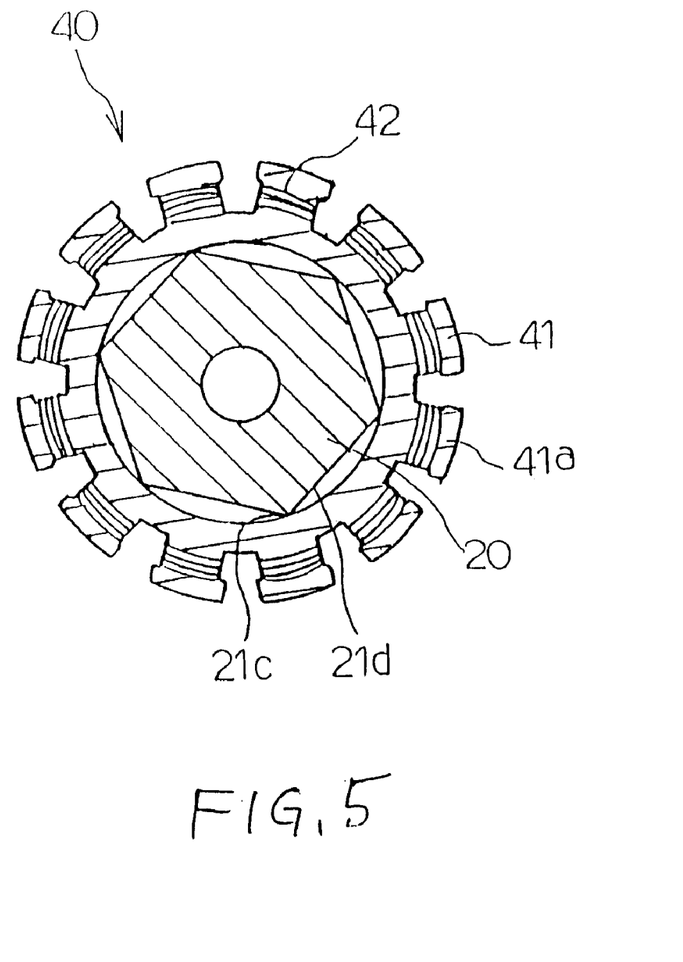
FIG. 5 is a sectional view of essential portions of other embodiment of a motor according to the invention in correspondence with FIG. 2.
Figure 6:
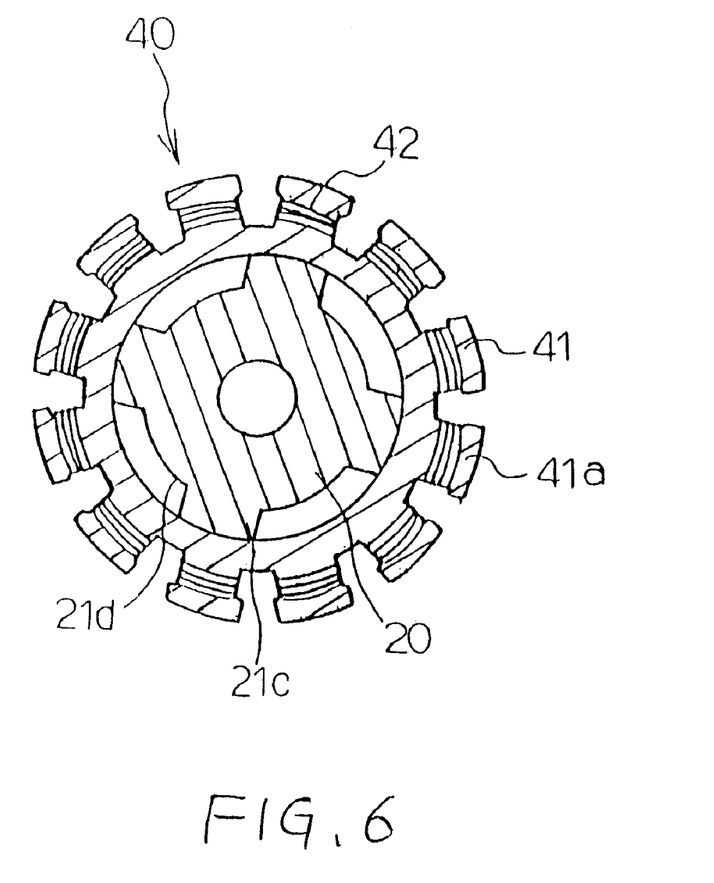
FIG. 6 is a sectional view of essential portions of other embodiment of a motor according to the invention in correspondence with FIG. 2.

Further, the contact portions and the separated portions may not be arranged at the inner peripheral face portion of the yoke 41 but may be formed at the outer peripheral face portion of the sleeve 20. For example, as shown by FIG. 5, the hollow portion of the yoke 41 may be formed in a shape of a circular cylinder, the outer peripheral portion of the sleeve 20 may be formed in a regular polygonal shape, edge portions of the sleeve 20 may be brought into contact with the inner peripheral face portions of the yoke as contact portions 21c by press-fitting the sleeve 20 to the hollow portion of the yoke 41 and plane portions among the edge portions may be separated from and opposed to the sleeve as separated portions 21d. As shown by FIG. 6, there may be formed teeth-like portions projected outwardly in the diameter direction from a plurality of locations of the outer peripheral face portion of the sleeve 20 over an entire length in the axial direction, the teeth-like portions may be brought into contact with the inner peripheral face portion of the yoke 41 as the contact portions 21c by press-fitting the sleeve 20 to the hollow portion of the yoke 41 and the outer peripheral face portions other than those at the plurality of locations may be separated from and opposed to the inner peripheral face portion of the yoke 41 as the separated portions 21d.

Although the contact portions 41c or 21c and the separated portions 41d or 21d need not to provide over the entire length in the axial direction of the yoke 41 or the sleeve 20, it is preferable in view of effectively avoiding the deviation in the rotational operation to arrange the contact portions and the separated portions by a predetermined length in the axial direction at the opposed portion where the yoke 41 and the sleeve 20 are opposed to each other and it is further preferable to arrange the contact portions and the separated portions over the entire length in the axial direction at the opposed portion. For example, according to the embodiments shown by FIG. 5 and FIG. 6, it is preferable that portions of the outer peripheral face portion of the sleeve 20 between the second stepped portion 20b and the third stepped portion 20c shown by FIG. 1 are formed in a regular polygonal shape or formed with teeth-like portions. At a portion downward from the second stepped portion 20b (one end side of the sleeve 20) or a portion upward from the third stepped portion 20c (the coil locking edge 23), the outer peripheral face thereof may be constituted by a circular peripheral face.

Further, although according to the respectives of the embodiments and modified examples, described above, the contact portions 41c or 21c are arranged on the diameters the same as those of the coils 42, the contact portions 41c or 21c may be arranged at positions at equal intervals from the contiguous coils 42. In this case, in rotating the motor, vibration generated at the coil 42 by suction and repulsion with the magnet at the rotor portion is transmitted after having been attenuated by the yoke 41 and accordingly, resonance at the yoke 41 is restrained to reduce and vibration is restrained to reduce.

Although according to the above-described embodiments, the sleeve 20 is formed separately from the base 10 and integrated thereto, the sleeve 20 may be formed integrally with the base 10.

Although according to the above-described embodiments, the contact portions 41c are formed linearly, in the above-described embodiments and respective modified examples, the contact portions 41c or 21c may be brought into contact with opposed portions of the sleeve 20 and the yoke 41 with no interruption over the entire lengths in the axial direction and may not be linear. For example, the contact portions 41c may be formed in a spiral shape or a meandering shape.

Although according to the above-described embodiments, the sleeve 20 is inserted and fixed to the yoke 41 by press fitting, the invention is not limited thereto but the sleeve 20 and the yoke may be formed by materials having different expansion coefficients and may be fitted to each other by shrinkage fitting by utilizing a difference between the expansion coefficients.

Although according to the above-described embodiments, the contact portions 41c are formed at 6 locations in the section in the radial direction, the invention is not limited thereto. However, it is preferable in view of load balance that with regard to the number of coils "m", the number of the contact portions 41c is N=k'm or m/k. Further, it is preferable that N is equal to or smaller than 12. When the number is excessively large, depending on contact force between the sleeve 20 and the yoke 41 after press fitting, there is a concern that force exerted on the contact portions 41c or 21c is excessively small, the contact portions 41c or 21c are not crushed, which is not different from the case of the section in the circular shape.

Although according to the above-described embodiments, the sleeve 20 is fixed to the base 10 by adhesion, the invention is not limited thereto but the sleeve 20 can be fixed thereto by press fitting, shrinkage fitting or screwing. For example, screws may be cut at the outer peripheral wall of the sleeve 20 and the fitting portion 10a of the base to thereby screw the base 10 to the fitting portion 10a. Further, the sleeve 20 and the base 10 may be adhered to each other at a position where a position in the axial line direction of the sleeve 20 relative to the base 10 becomes pertinent by screwing. Further, a hole may be perforated at the base 10 in place of the fitting portion.

Although according to the above-described embodiments, the bearing means (the retaining ring 51 and the bearing ring 52) for supporting the hub shaft 30 constituting the rotor member serves also as restricting means, similar restricting means may be provided other than the bearing means.

Further, although according to the above-described embodiments, the sleeve 20 as the supporting member for supporting electromagnets functions as a portion of receiving means for generating dynamic pressure along with the bearing ring 52, similar bearing means may be provided separately from the sleeve 20.

The rotor magnet 60 may be a permanent magnet or an electromagnet. Further, a plurality of magnets may be fixed to the inner peripheral wall of the hub shaft 30 or one radially anisotropic magnet in a cylindrical shape may be fixed to the inner peripheral wall of the hub shaft 30.

Although according to the above-described embodiments, the shaft of the rotor member (the hub shaft 30) is supported by the oil dynamic pressure bearings of the supporting member (the sleeve 20), the bearing means are not limited thereto but may be constituted by air dynamic pressure bearings, hydrostatic bearings, roller bearings or sliding bearings. Further, in the case of the dynamic pressure bearings, instead of providing the grooves 52a, 52b and 52c for generating dynamic pressure at the bearing ring 52, the dynamic pressure bearings may be constituted by so-to-speak noncircular plane bearings in which projections are formed at the outer peripheral wall of the sleeve 20 and slopes are formed at the inner peripheral wall in a situation in which the sleeve 20 is fitted to the fitting portion 10a of the base or so-to-speak segment bearings in which a plurality of segments are arranged in place of the bearing ring 52.

Although according to the above-described embodiments, the motor is of an outer rotor type in which the rotor magnets 60 are arranged outward from the electromagnets in the radius direction, the invention is not limited thereto but the motor may be a motor of an inner rotor type. Further, the motor may be a motor not of a radial gap type but of an axial gap type. However, in these cases, for example, it is necessary to change shapes of respective members or add members such that two peripheral walls of a first peripheral wall of fixing electromagnets and a second peripheral wall for generating dynamic pressure between the bearing ring 52 and the second peripheral wall are arranged to the sleeve 20.

Further, in the specification, "rotation" in the case of rotating the rotor member or the bearing ring, signifies relative rotation relative to the base or the sleeve. Therefore, the invention includes a motor or a rotary body apparatus in which the rotor member (the hub shaft 30) is fixed to an outside member and the supporting member (the sleeve 20) is rotated relative to the outside.

Although according to the above-described embodiments, the hard disk apparatus is constituted by supporting and rotating a plurality of sheets of disks, only one sheet of disk may be supported and rotated.

Although according to the above-described embodiments, the rotary body apparatus is constituted by the hard disk drive, the invention is not limited thereto but may be other disk drive such as CD-ROM drive, for example, a rotary polygonal face mirror apparatus constituted by attaching polygonal mirrors to a spindle of a spindle motor or other apparatus.

As has been explained, according to the motor of the invention, at least either of the inner peripheral face portion of the yoke having the hollow portion and the outer peripheral face portion of the supporting member inserted into the hollow portion and fixed, the contact portions projected linearly to other thereof are formed at three or more locations in the circumferential direction interposing the separated portions and accordingly, when the supporting member is fixed to the yoke by press fitting, the contact portions are crushed in accordance with the shape of the other and are brought into contact with the other with certainty. Therefore, contact portions of the supporting members and the yoke can be controlled by positions of arranging the contact portions, which is easy to deal with in view of design with regard to vibration or deviation generated in the rotational operation.

Further, the supporting member and the yoke are brought into contact with each other linearly at three or more locations on the circumference and accordingly, the supporting member and the yoke are difficult to deviate from each other in the rotational operation and vibration or noise caused by the deviation can be restrained to reduce.

By the method of fabricating the motor according to the invention, the stator coil can be solidly supported with high rigidity and vibration and noise can be restrained to reduce.

According to the rotary body apparatus of the invention, by providing the motor according to the invention, vibration and the noise can be restrained to reduce.

What is claimed is:

1. A motor comprising:

a base;

a supporting member in a column-like shape erected on the base;

a yoke having a hollow portion at least one end of which communicates with outside, said hollow portion being inserted by the supporting member and coaxially fixed to the supporting member;

coils formed by winding lead wires at a plurality of locations of the yoke for generating a rotary magnetic field;

a rotor member coaxially with and rotatably supported by the supporting member; and a rotor magnet fixed to the rotor member and urged by the rotary magnetic field for rotating the rotor member;

wherein at least one of an inner peripheral face portion of the yoke and an outer peripheral face portion of the supporting member comprises contact portions linearly projected to other thereof and brought into contact with the other at three or more locations in a circumferential direction thereof and separated portions separated from the other and opposed to the other among the contact portions.

2. The motor according to claim 1:

wherein a portion of the supporting member opposed to the yoke is formed in a shape of a circular cylinder; and wherein the yoke is formed with the hollow portion substantially in a shape of a polygonal cylinder coaxially with the supporting member, substantially central portions among corner portions of the inner peripheral face portion form the contact portions and plane portions reaching from the substantially central portions to the corner portions on both sides thereof form the separated portions.

3. The motor according to claim 1:

wherein a portion of the supporting member opposed to the yoke is formed in a shape of a circular cylinder; and wherein the yoke includes a ring-like portion formed with the hollow portion and teeth-like portions projected inwardly from a plurality of locations of an inner peripheral face portion of the ring-like portion over an entire length in an axial direction of the ring-like portion, the teeth-like portions form the contact portions and the separated portions are formed by other than the plurality of locations in the inner peripheral face portion.

4. The motor according to claim 1:

wherein the yoke includes the hollow portion substantially in a shape of a circular cylinder; and wherein the supporting member is formed substantially in a shape of a polygonal cylinder, edge portions thereof form the contact portions and plane portions among the edge portions form the separated portions.

5. The motor according to claim 1:

wherein the yoke includes the hollow portion substantially in a shape of a circular cylinder; and wherein the supporting member includes a cylindrical portion and teeth-like portions projected outwardly from a plurality of locations of an outer peripheral face portion of the cylindrical portion over an entire length in an axial direction of the yoke, the teeth-like portions form the contact portions and the separated portions are formed by other than the plurality of locations in the outer peripheral face portion.

6. The motor according to claim 1:

wherein a number m of the coils of the stator coil and a number N of the contact portions are in a relationship of a following equation $N = k'm$ or $N = m/k$ (where k designates a natural number).

7. The motor according to claim 6:

wherein the contact portions are arranged on diameters the same as diameters of the coils of the stator coil.

8. The motor according to claim 6:

wherein the contact portions are arranged at positions at equal intervals from contiguous ones of the coils of the stator coil.

9. The motor according to claim 1:

wherein the supporting member is formed separately from the base and one end portion thereof is fixed to and erected on the base.

10. A rotary body apparatus, said rotary body apparatus including the motor according to claim 1.

* * * * *